United States Patent [19]

Daude et al.

[11] Patent Number: 4,830,806
[45] Date of Patent: May 16, 1989

[54] METHOD AND DEVICE FOR THE MANUFACTURE OF A HIGH OPTICAL QUALITY TRANSPARENT SHEET OR PLASTIC

[75] Inventors: Gerard Daude, Villenave D'Ornon; Jean-Louis Bravet, Thourotte; Michel Moncheaux, Compiegne; Sylvie Drujon, Thourotte; Gérard Dimier, Talence, all of France

[73] Assignee: Saint-Gobain Vitrage, Courbevoie, France

[21] Appl. No.: 66,012

[22] Filed: Jun. 24, 1987

[30] Foreign Application Priority Data

Jun. 24, 1986 [FR] France ................ 86 09081

[51] Int. Cl.⁴ .............. B29C 41/28; B29C 71/02; C08G 18/08
[52] U.S. Cl. .................... 264/216; 264/236; 264/331.19; 264/338; 425/224; 425/445
[58] Field of Search ........... 264/54, 216, 207, 1.6, 264/2.6, 236, 338; 425/224, 445

[56] References Cited

U.S. PATENT DOCUMENTS

| Re. 32,224 | 8/1986 | Schäfer et al. | 428/423.1 |
|---|---|---|---|
| 2,431,042 | 11/1947 | Ingersoll | 264/216 |
| 2,510,967 | 6/1950 | Flanagan | 264/214 X |
| 2,850,467 | 9/1958 | Livingood | 264/54 |
| 2,926,104 | 2/1960 | Goetz | 264/207 |
| 3,979,548 | 9/1976 | Schäfer et al. | 428/38 |
| 4,232,080 | 11/1980 | Orain et al. | 428/215 |
| 4,331,736 | 5/1982 | Schäfer et al. | 264/2.3 X |
| 4,605,528 | 8/1986 | Petitcollin et al. | 264/216 |

FOREIGN PATENT DOCUMENTS

| 692888 | 6/1953 | United Kingdom . |
| 1562767 | 3/1980 | United Kingdom . |
| 1576394 | 10/1980 | United Kingdom . |

OTHER PUBLICATIONS

*The American Heritage Dictionary*, Second College Edition, Boston, Houghton Mifflin Co., 1982, p. 671.

Primary Examiner—Philip Anderson
Attorney, Agent, or Firm—Oblon, Fisher, Spivak, McClelland & Maier

[57] ABSTRACT

The invention is directed to the method, products and apparatus for the manufacture of a high optical quality sheet of plastic comprising a polyurethane layer having energy-absorbing properties obtained by reactive pouring or reactive pulverization of the reaction components.

In accordance with the invention, the polyurethane layer is treated, while it is in a state of ongoing polymerization corresponding to an NCO/CH ratio of less than 0.7, with water in a liquid or vapor form and then subsequently, after rolling with an interpolated film, stocking and unrolling, the layer is subjected to heat treatment.

14 Claims, 2 Drawing Sheets

METHOD AND DEVICE FOR THE MANUFACTURE OF A HIGH OPTICAL QUALITY TRANSPARENT SHEET OR PLASTIC

BACKGROUND OF THE INVENTION

1. Field of the Invention

The invention relates to the manufacture of a high optical quality transparent plastic sheet which can be used alone or in association with other materials, particularly in laminated glazings.

2. Discussion of the Background

Plastic sheets capable of being used in laminated glazings of the type mentioned above have already been proposed. For example, in British Patent No. 1576394, a sheet is described which has two layers (1) a layer of a thermoplastic material which, in the laminated glazing application comprising a single sheet of glass, is an interpolated layer with energy-absorbing properties, and (2) a layer of heat-hardenable material with anti-lacerating and auto-cicatrizing properties, such that it is resistant to scratching and abrasion.

The interpolated layer with energy-absorbing properties is a thermoplastic polyurethane obtained from at least one aliphatic diisocyanate and at least one polyesterdiol or polyetherdiol, with a ratio of NCO groups to OH groups of between 0.8 an 0.9. Glazing using such a two-layer sheet retains good optical properties and adhesion between the elements, but the bio-mechanical properties of the glazing and, in particular its shock-resistance, are not completely satisfactory. On the other hand, the two-layer plastic sheet can be rolled and easily handled without deterioration of its optical quality.

European Patent No. 0 133 090 further discloses a high optical quality transparent sheet which can be used alone or in association with other materials particularly in the manufacture of the laminated glazings described above. This sheet comprises a layer formed in a continuous process by reactive pouring onto a flat horizontal support, from which it is detachable, of a reaction mixture of an isocyanate component and a component with active hydrogens, in particular a polyol component. The isocyanate component comprises at least one aliphatic or cycloaliphatic diisocyanate or a diisocyanate prepolymer and this component has a viscosity of below approximately 5000 centipoises at $+40°$ C. The polyol component comprises at least one difunctional long polyol with a molecular weight of between 500 and 4000 and at least one short diol as a chain extending agent. Reactive pouring signifies pouring in the form of a layer or a film of a liquid mixture of the components in the monomeric or prepolymeric state, followed by the polymerization of said mixture using heat.

Safety glazing using such a layer has good biomechanical properties under variable conditions of temperature and humidity. However, when the sheet is rolled to form reels, using an interpolated film which is generally polyethylene, and then the sheet is subsequently unrolled before use, marks or impressions left by the interpolated film are observed on the polyurethane layer with energy-absorbing properties (more simply designated as the "EA layer").

These marks cannot subsequently be removed completely, even when the plastic sheet is subjected to a heat cycle of several minutes at a temperature above $100°$ C., for example 10 minutes at $120°$ C.

Marking of the plastic sheet occurs regardless of the degree of polymerization of the EA layer. The marking is, however more accentuated when the degree of polymerization is lower. To determine the degree of polymerization of the EA layer, a simple method consists of measuring the ratio between the height of the NCO peaks and the height of the CH peaks of the infrared spectrum of the EA layer upon exiting the polymerization area. It is considered that the EA layer is completely polymerized when the NCO peak has disappeared.

In effect, it would seem that the polymerization or the aging of the layer is never total at the end of an assembly line. To obtain complete polymerization, a polymerization heat cycle must be used which is much longer than the cycles normally used in industrial production or higher temperatures must be used.

Thus, the problems which remain unsolved by the prior art are the following. When a two-layer sheet is utilized which retains good optical properties and adhesion, there is unsatisfactory biomechanical properties present such as a decrease in shock resistance.

When a layer is prepared with satisfactory biomechanical properties, there occurs extensive marking as a result of the rolling/unrolling of the sheets.

SUMMARY OF THE INVENTION

It is an object of this invention to provide a method of manufacturing a high optical quality polyurethane layer which has good energy-absorbing and biomechanical properties, and which is resistant to marking, scratching and abrasion.

It is a further object of this invention to provide such high-optical quality polyurethane layers.

It is a third object of this invention to provide an apparatus for conducting the manufacture of such high-optical quality polyurethane layers.

The invention provides a method for manufacture of an EA layer whereby said layer has excellent resistance to marking, and in particular to marking which could occur when it is rolled into a reel for ease of handling and stocking.

In both cases, the economic disadvantages are obvious.

The invention proposes a method for manufacture of the EA layer which is rapid and economical and which, as necessary, gives it excellent resistance to marking, in particular marking during winding in the form of a reel, which winding enables it to be easily handled and stocked.

Layer is used to mean both the layer on its forming support and the sheet detached from said support.

In accordance with the invention, the EA polyurethane layer obtained by reactive pouring onto a flat pouring support as described above or further obtained by reactive pulverization, which is in an ongoing state of polymerization corresponding to an NCO/CH ratio of below 0.7, is subjected to treatment by water in a liquid or vapor form and, preferably, when the water is in a liquid form, by hot water at a temperature above $80°$ C., in order to obtain a nil NCO/CH ratio (equal to zero).

The treatment with water in accordance with the invention enables the polymerization of the layer to be completed rapidly whilst retaining and even improving the mechanical properties of the layer, in particular its resistance to breakage and its resistance to stretching.

Layer here is used to mean both the layer on its forming support and the sheet detached from said support.

BRIEF DESCRIPTION OF THE DRAWINGS

Other advantages and characteristics of the invention will become apparent from the following description of devices for carrying out the invention, when considered in connection with the accompanying drawings.

DETAILED DESCRIPTION OF THE PREFERRED EMBODIMENTS

Figure 1:
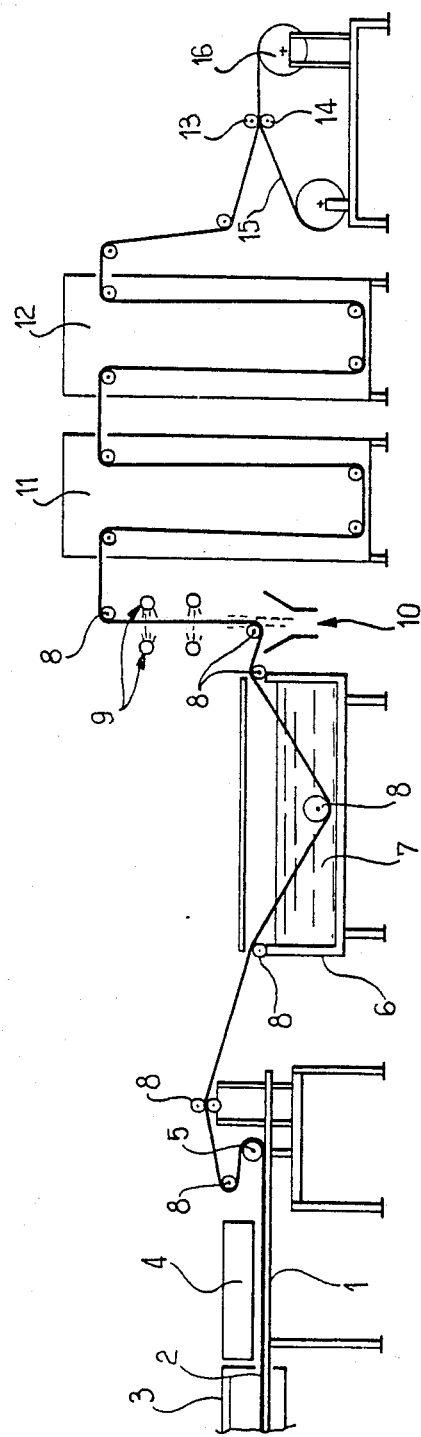
FIG. 1 represents a device in accordance with the invention for the treatment of the EA layer by steeping in a bath of hot water.

The device shown in FIG. 1 is used for the treatment of the EA layer by steeping it in hot water, and preferably boiling water. This device comprises a horizontal pouring bed 1, for example in glass, onto which, using a pouring head (not shown), the reaction mixture capable of forming the EA layer 2 has been poured, a polymerization tunnel 3, only the downstream end of which is shown in the drawing. At the exit of the polymerization tunnel, the device contains a cooling chamber 4 and means for removal 5 of the layer from its support, said removal means here being a removal roller. Downstream of the removal means a vat 6 is provided which contains hot water 7 for the treatment. The EA layer is placed therein using return rollers 8 and is maintained immersed therein for a period lasting approximately 5 minutes. Using other return rollers 8, the layer is taken out of the bath and then passes through a double row of means for rinsing 9 by water projection. The rinsing water is collected in a funnel 10 and the layer is introduced into a drying chamber 11 and then into a cooling chamber 12. At the exit of the cooling chamber 12, the treated EA layer is associated during the passage between two rollers 13, 14 with a polyethylene film 15, is rolled to form a reel 16 and then stocked.

Figure 2:
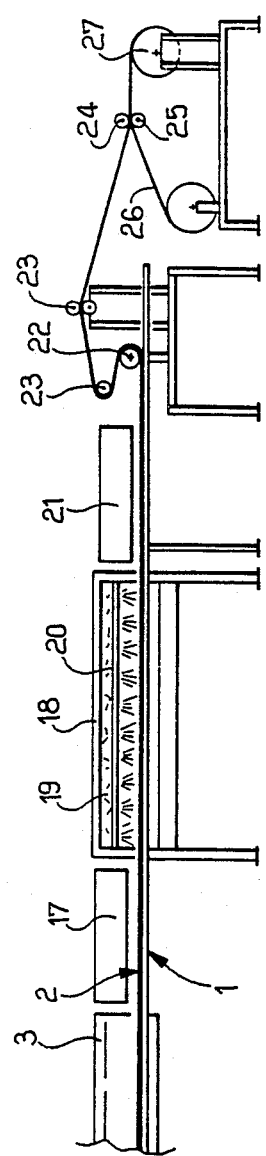
FIG. 2 represents a device in accordance with the invention for the treatment of the EA layer with water vapor.

The device shown in FIG. 2 is used for the treatment of the EA layer with water vapor. Like the device described in relation to FIG. 1, it comprises a horizontal glass pouring bed 1, onto which, using a pouring head (not shown), a reaction mixture capable of forming the EA layer 2 has been poured, and a polymerization tunnel 3, only the downstream end of which is shown in the drawing. At the exit of the polymerization tunnel, the device contains a cooling chamber 17, interposed between the end of the tunnel and the chamber 18 containing the water vapor 19 brought by a ramp 20 for the treatment of the EA layer. The layer passes through this chamber while it is still in contact with its pouring support 1. Downstream of the vapor treatment chamber, the device comprises a cooling chamber 21 which precedes the means for removal 22 of the EA layer from its pouring support. After passage around return rollers 23, the treated layer, during passage between two rollers 24, 25, is associated with an interpolated polyethylene film 26 before being rolled to form a reel 27 and then stocked.

In accordance with the invention, the EA polyurethane layer, which is obtained by reactive pouring onto a flat pouring support as described above or obtained by reactive pulverization and which is in an ongoing state of polymerization corresponding to an NCO/CH ratio of below 0.7, preferably between 0 and 0.4, is subjected to treatment using water in a liquid or vapor form and, preferably, when the water is in a liquid form, with hot water at a temperature of greater than 80° C., perferably between 90°-100° C., and after rolling the layer with an interpolated film, possible stocking and unrolling of the layer, said layer is subjected to an appropriate heat treatment, for example a cycle of one minute or more at a temperature of approximately 100° C., preferably between 95°-105° C.

To accelerate the treatment, water which is preferably at a temperature of greater than 90° C., is used for at least one minute.

The treatment with hot water in accordance with the invention does not actually remove the marking from the layer which is due to rolling with the interpolated film, but it is no longer a persistant marking since it can disappear during the heat treatment of the layer which follows the unrolling from the reel or the unstacking of the sheets. The heat treatment can be carried out just before the assembly with the support to form the glazing. Therefore, the invention proposes a method which, while not preventing the EA layer from being marked when rolled, enables said layer to revert to its original optical qualities, in particular its qualities of transparency, after heat treatment, for example, heating at a temperature on the order of 100° C. and above generally for at least 1 minute.

The treatment with water in accordance with the invention can be carried out with water in a liquid form. In this case, the layer is steeped in a hot water bath, preferably a bath of boiling water at 100° C. As indicated above, as the temperature of the water in the bath is increased, the duration of the treatment may be decreased in order to achieve a similar effect.

To further decrease the length of this water treatment, an aqueous solution is preferably used which contains an amine catalyst in an amount of 1 to 10% by weight of the solution, and preferably between 1% and 5% by weight.

Suitable amine catalysts are all the amine catalysts known in the art to assist the reaction between isocyanate groups and water. The catalyst is preferably selected from the group formed by diazabicyclo n-decene (for example the product sold under the name DBU by ABBOT LAB), triethylenediamine (for example the product sold under the name DABCO by AIR PRODUCTS), a mixture of said product and dipropyleneglycol, or polyalkylenepolyamines (for example the product sold under the name BEROLAMINE 353 by BEROL).

In an alternative embodiment, an aqueous solution can be used for the treatment of the layer, by adding other products to the water, in particular a product which reacts with the isocyanates, for example sodium bisulfite $NaHSO_3$ in an amount of approximately 10% by weight of the aqueous solution, or even diamines.

The water treatment can preferably be carried out using water in the form of vapor. One of the advantages of using water vapor is that it can be used at temperatures of greater than 100° C., for example between 120° C. and 140° C., at atmospheric pressure. A further advantage of the use of the vapor is that it can be used while the formed EA layer is still on the formation support.

In contrast, when a liquid bath is used, it appears necessary to work on the sheet detached from its formation support. There may then be a risk of marking before the treatment due to the sheet removal means. Of course, the layer can also be treated with water vapor when it has been detached from the formation support.

The layer can also be treated in two steps: a first step using vapor before it comes into contact with the removal means and a subsequent step using liquid water or water vapor.

In addition to the advantages indicated above, the treatment in accordance with the invention accelerates the ripening of the EA layer. In an unexpected manner it improves the mechanical properties of the layer by increasing its resistance to breaking and to stretching.

The EA layer which is treated in accordance with the invention has been described above in a general manner. The amounts of the components of the polyurethane forming the EA layer are selected so as preferably to obtain a stoichiometrically balanced system, that is that the ratio of the equivalent NCO groups provided by the diisocyanate component to the equivalent OH groups provided by the polyol component, that is, the long polyol(s) and the short diol(s), is on the order of 1. When the NCO/OH ratio is less than 1, as it decreases, the desired mechanical properties for application in a laminated glazing rapidly become less satisfactory, with the lower limit for the NCO/OH ratio for obtaining satisfactory mechanical properties being situated at approximately 0.9. When at least one of the components is trifunctional, this lower limit can be lowered to approximately 0.8. When the NCO/OH ratio is greater than 1, as it increases, certain mechanical properties of the layer obtained by reactive pouring are reinforced, for example the layer becomes more rigid, but in view of the high cost of the isocyanate component in relation to that of the polyol component, the choice of these NCO/OH ratios of substantially equal to 1 is a good compromise between the properties obtained and the cost.

The proportions of the long polyol and the short diol can vary as a function of the desired properties and also of the ratio of the equivalent groups, with the number of equivalent OH groups due to the short diol, however, generally representing from 20 to 70% of the total equivalent groups of the mixture forming the polyol component when the ratio of the equivalent NCO groups to the OH groups is on the order of 1. When the proportion of the short diol is increased, the layer is hardened and its modulus is generally increased.

Suitable diisocyanates used in the framework of the invention are in particular selected from among the following difunctional aliphatic isocyanates: hexamethylenediisocyanate (HMDI), 2,2,4-trimethyl 1,6-hexanediisocyanate (TMDI), bis-4-isocyanatocyclohexylmethane (Hylene W), bis-3-methyl-4-isocyanatocyclohexylmethane, 2,2-bis-(4-isocyanatocyclohexyl) propane, 3-isocyanatomethyl-3,5,5-trimethylcyclohexylisocyanate (IPDI), m-xylylenediisocyanate (XDI), m- and p-tetramethylxylylenediisocyanate (m- and p-TMXDI), cis- and trans-1,4-cyclohexane diisocyanate (CHDI), 1,3-(diisocyanatomethyl) cyclohexane (hydrogenated XDI).

An isocyanate component containing urea functions can be used. These urea functions improve certain mechanical properties of the layer. The amount of urea can represent up to approximately 10% of the total weight of the isocyanate component with urea functions. The amount of urea is preferably between 5 and 7% of the total weight of said component. For the reason mentioned above, 3-isocyanatomethyl-3,5,5-trimethylcyclohexyldiisocyanate containing urea functions (IPDI and derivatives) is preferably used.

Suitable long polyols are selected from among polyetherdiols or polyesterdiols with a molecular weight of 500–4000; the polyesterdiols are the esterification products of a diacid, such as adipic acid, succinic acid, palmitic acid, azelaic acid, sebacic acid or ophthalic acid, and a diol such as ethyleneglycol, 1,3-propanediol, 1,4-butanediol, 1,6-hexanediol, polyetherdiols having the general formula H─[O(CH$_2$)$_n$]$_m$OH wherein n=2 to 6; m is such that the molecular weight is situated between 500–4000 or polyetherdiols having the general formula

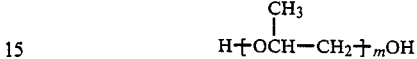

with m such that the molecular weight is also situated between 500–4000. Polycaprolactonediols can also be used.

A polytetramethylene glycol (n=4) with a molecular weight of 1000 is preferably used.

The suitable chain extending agents are short diols with a molecular weight of less than approximately 300 and preferably less than 150, such as: ethyleneglycol, 1,2-propanediol, 1,3-propanediol, 1,2-, 1,3- or 1,4-butanediol, 2,2-dimethyl-1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl 2,4-pentanediol, 3-methyl 2,4-pentanediol, 2-ethyl 1,3-hexanediol, 2,2,4-trimethyl-1,3pentanediol, diethylene glycol, triethylene glycol, tetraethyleneglycol, 2-butyne-1,4-diol 1,4-butenediol and decynediol, which may be substituted and/or esterified, hydroquinone-bis-hydroxyethylether, bisphenol A esterified with two or four groups of propylene oxide, dimethylolpropionic acid. In general, the shorter the diol, the harder the layer.

1,4-butanediol is preferably used which is a good compromise for obtaining a layer which is neither too hard nor too flexible, which is desired for this type of application as an energy absorber.

One of the characteristics of the layer with energy-absorbing properties is that obtained by reactive pouring onto a flat horizontal support. In the case of difunctional starting materials, this reactive pouring, one form of which has already been described for example in U.S. Pat. No. 4,283,363 for obtaining a heat-hardenable polyurethane layer from a mixture of trifunctional components, provides a layer which is not fully thermoplastic when the ratio of NCO/OH groups is substantially equal to 1.

The polyol component can contain a small amount of at least one polyol with a functionality of greater than 2 and, in particular, monomeric aliphatic triols, such as glycerol, trimethylolpropane, triols with polyether chains, polycaprolactone triols, with the molecular weight of said triols generally between 90 and 1000, or mixed polyether/polyether polyols with a functionality of greater than 2, for example a functionality of between 2 and 3. The addition of a polyol with a functionality of greater than 2 causes additional bridging bonds between the polyurethane chains and can thus further improve the cohesion of the layer.

The proportions of the long polyol, the short diol and possibly the polyol with a functionality of greater than 2 can vary depending on the desired properties. Proportions are generally selected such that for a hydroxyl equivalent the long polyol represents approximately from 0.30 to 0.45 equivalent, the short diol approximately 0.2 to 0.7 equivalent and the polyol with a functionality of greater than 2 approximately 0 to 0.35 equivalent.

The layer can also be produced by replacing part of the polyol component with a product with different active hydrogens, such as an amine.

In accordance with one embodiment of the plastic layer, the isocyanate component can contain in limited amounts, for example less than approximately 15% in NCO equivalent, at least one triisocyanate such as an isocyanate or a triisocyanurate biuret.

In accordance with one aspect of the method of treatment in accordance with the invention, it is applied onto the sheet formed of the single layer described above.

In an alternative embodiment, the method of treatment in accordance with the invention is applied onto the layer described above while is it assaciated with a layer of auto-cicatrizing plastic, i.e., one which is resistant to scratching and abrasion.

The auto-cicatrizable scratch-resistant plastic layer is for example that described in U.S. Pat. Nos. 4,232,080, 3,979,548 and RE 32224. Under normal temperature conditions, this auto-cicatrizing layer has a high capacity for elastic deformation, a low modulus of elasticity, below 2000 daN/cm$^2$ and preferably below 200 daN/cm$^2$, and stretching to breakage of more than 60% with less than 2% plastic deformation, and preferably stretching to breakage of more than 100% with less than 1% plastic deformation. The preferred layers of this type are heat-hardenable polyurethanes having a modulus of elasticity of approximately 25 to 200 daN/cm$^2$ and stretching of approximately 100 to 200% with less than 1% plastic deformation.

Examples of monomers which are suitable for the preparation of these heat-hardenable polyurethanes are on the one hand the difunctional aliphatic isocyanates, such as 1,6-hexanediisocyanate, 2,2,4-trimethyl-1,6-hexanediisocyanate, 2,4,4-trimethyl-1,6-hexanediisocyanate, 1,3-bis(isocyanatomethyl) benzene, bis(4-isocyanatocyclohexyl)methane, bis(3-methyl-4-isocyanatocyclohexyl) methane, 2,2-bis(4-isocyanatocyclohexyl) propane and 3-isocyanatomethyl-3,5,5-trimethylcyclohexylisocyanate, as well as the biurets, isocyanurates and prepolymers of those compounds having a functionality of 3 or more and, on the other hand, the polyfunctional polyols, such as the branched polyols, such as the polyesterpolyols and polyetherpolyols obtained by reaction of polyfunctional alcohols, in particular 1,2,3-propanetriol (glycerol), 2,2-bis(hydroxymethyl)-1-propanol (trimethylolethane), 2,2-bis(-hydroxymethyl)-1-butanol (trimethylolpropane), 1,2,4-butane-triol, 1,2,6-hexane-triol, 2,2-bis(hydroxymethyl)-1,3-propane-diol (pentaerythritol) and 1,2,3,4,5,6-hexane-hexol (sorbitol), with aliphatic diacids such as malonic acid, succinic acid, glutaric acid, adipic acid, suberic acid and sebacic acid or with cyclic ethers such as ethylene oxide, 1,2-propylene oxide and tetrahydrofuran.

The molecular weight of the branched polyols is preferably approximately 200 to 4000 and preferably approximately 450 to 2000. Mixtures of different monomeric polyisocyanates and polyols can be used. A particularly preferred heat-hardenable polyurethane is the one described in U.S. Pat. Nos. 3,979,548 and RE 32224.

The layer with the energy-absorbing properties, the EA layer, can contain various additives which generally act to facilitate its manufacture by reactive pouring, or which can improve its properties.

It can contain a catalyst such as a tin catalyst, for example dibutyltin dilaurate, tributyltin oxide, tin octoate, an organomercuric catalyst, for example phenylmercury propionate, or an amine catalyst, for example diazabicyclo-(2,2,2)-octane, 1,8-diazabicyclo(5,4,0)-7-undecene.

The layer can contain a stabilizing agent such as bis(2,2,6,6-tetramethyl-4-piperidyl) sebacate, a phenolic anti-oxidizing agent.

The layer can also contain a sheeting agent such as a silicone resin, a fluoroalkylated ester or an acrylic resin.

In order to manufacture the sheet of the alternative embodiment with two layers, the following method can be used:

A heat-hardenable polyurethane layer is first manufactured by pouring the mixture of the components onto a pouring support. After polymerization of the monomers and formation of a heat-hardenable layer with a thickness which can vary between 0.1 and 0.8 mm, the reaction mixture of the components of the layer with energy-absorbing properties is poured. After polymerization, the EA layer is treated with water or water vapor as described above.

The invention also relates to a device for carrying out the method for formation of the EA layer and its treatment with water or water vapor.

This device comprises a pouring support composed of a flat movable bed for forming the EA layer, a pouring head for the supply of the reaction mixture capable of forming the EA layer, a polymerization tunnel, means for treatment with water in liquid or vapor form, means for removing the sheet from the pouring support and, as necessary, means for rolling the sheet in the form of a reel.

The water treatment means are arranged downstream of the means for removing the sheet from the pouring support when the water is in liquid form, such that the one-layer or two-layer plastic sheet can be steeped in the liquid.

When the treatment is carried out using water vapor, the treatment means are preferably placed upstream of the removal means which generally consist of a removal roller, such that no marking by these removal means can take place prior to the treatment.

Other features of the invention will become apparent in the course of the following descriptions of exemplary embodiments which are given for illustration of the invention and are not intended to be limiting thereof.

EXAMPLE 1

On a movable glass support passing in a continuous manner, coated with a separation agent which may for example be that described in U.S. Pat. No. 4,331,736 that is an addition product modified with ethylene oxide, a homogeneous mixture was poured in the following proportions:

1000 g of a polyether with a molecular weight of approximately 450 obtained by oxide condensation of 1,2-propylene with 2,2-bis(hydroxymethyl)-1-butanol having a content of free hydroxyl radicals of approximately 10.5 to 12%, containing 1% by weight of a stabilizing agent, 0.05% by weight of a dibutyltin dilaurate catalyst and 0.1% by weight of a sheeting agent, 1020 g of a 1,6-hexanediisocyanate biuret with a content of free isocyanate radicals of approximately 23.2%.

A pouring head such as is described in British Patent No. 1,562,767 was used. A uniform layer was formed which, after polymerization under the effect of heat, for example approximately 15 minutes at 120° C., had a thickness of approximately 0.19 mm and auto-cicatrizing properties.

In order to manufacture the layer having the energy-absorbing properties, the polyol component was prepared in advance by mixing a polytetramethylene glycol with a molecular weight of 1000 (for example the product sold under the name Polymeg 1000 by QUAKER OATS) with 1,4-butanediol, with the proportions of the two components being such that the polytetramethylene glycol brought 0.37 equivalent in hydroxyl groups whereas the 1,4-butanediol brought 0.63.

A stabilizing agent in an amount of 0.5% by weight of the total weight of the polyol component and of the isocyanate component, a sheeting agent in an amount of 0.05% by weight calculated in the same manner and a catalyst, dibutyltin dilaurate, in an amount of 0.02% by weight calculated in the same manner as above were incorporated into the polyol component.

The isocyanate compound used was 3-isocyanatomethyl-3,5,5-trimethylcyclohexylisocyanate (IPDI) having urea functions obtained by partial hydrolysis of th IPDI and having a content of NCO groups of approximately 31.5% by weight.

The components were taken in quantities such that the NCO/OH ratio was 1.

After degassing the components under a vacuum, the mixture brought to approximately 40° C. was poured using a pouring head such as the one described in British Patent No. 1,562,767, onto the previously formed autocicatrizing polyurethane layer. In this manner a layer with a thickness of approximately 0.53 mm was formed which was subjected to a polymerization cycle consisting of heating for 20 minutes at approximately 120° C.

At the exit of the polymerization tunnel, the NCO/CH ratio measured 0.6. The sheet on its pouring support then passed into the part of the device shown in FIG. 1. It therefore passed under the cooling chamber 4.

The sheet was then removed from the pouring support by roller 5 and plunged into a bath 7 of boiling water at 100° C. The length of the treatment was 10 minutes. At the exit of the treatment bath, the NCO/CH ratio measured 0.

The sheet then passed through a heated chamber 11 to be dried and then into a cooling chamber 12.

The sheet could be used directly for the manufacture of laminated safety glasses.

The bio-mechanical properties which could be measured on the glass obtained were at least equivalent to those of a glass formed with an untreated EA layer. Table 1 attached hereto gives the values of resistance to breakage as well as the results with marking of the layers obtained in the various examples.

EXAMPLE 2

The method of Example 1 was repeated, but after cooling the sheets was associated with an interpolated rolling polyethylene film 15 and then the assembly was rolled to form a reel 16.

The sheet was stocked on the reel for several days. The sheet was then unrolled and separated from the interpolated film. Impressions were observed on the EA layer which were essentially due to the contact of the interpolated film and its surface irregularities.

The sheet was then submitted to a heat treatment consisting of bringing its temperature to 100° C. for 5 minutes. After this treatment, the impressions had disappeared and the sheet was assembled with a glass support to form a glazing. No marking was found subsequently.

REFERENCE EXAMPLE 1

A plastic sheet was prepared in the manner described in Example 1, except that it was not subjected to the treatment with boiling water. The sheet was therefore rolled directly onto the reel after the polymerization cycle.

After stocking and unrolling as described in Example 1, the impressions described previously were observed, but when the sheet was subjected to heat treatment at 100° C. for 5 minutes, these impressions did not disappear. After assembly with the support to form the glazing, the impressions were still present.

It could therefore be noted that while the treatment with boiling water described in Example 1 did not prevent the EA layer from being marked in the reel after the polymerization cycle, it gave it the property of being able to remove said impression by heat treatment after unrolling the sheet.

REFERENCE EXAMPLE 2

The same method was used as in Example 1, except that the sheet was treated with water at a temperature of 80° C. for 10 minutes. After this treatment the NCO/OH ratio was 0.4.

The sheet was rolled, stocked and then unrolled. The apparent impressions remained after the heat treatment and they continued to appear on the assembled glazing.

REFERENCE EXAMPLE 3

The same method was used as in Example 1, but the polymerization cycle of the polyurethane layer was reduced to 20 minutes at 100° C. At the exit of the polymerization tunnel, the NCO/CH ratio measured 0.8.

After treatment with boiling water, the NCO/CH ratio measured 0.2.

After removal, stocking and unrolling, the sheet had impressions which, after the heat treatment, did not totally disappear.

EXAMPLE 3

The same method was used as in Example 1. At the exit of the polymerization tunnel, the NCO/CH ratio measured 0.6. The sheet, after removal from the pouring support, was plunged for 5 minutes in a bath of boiling water at 100° C. containing 1% by weight of DBU.

At the exit of the bath, the NCO/CH ratio measured 0. The sheet was rinsed by passage in front of rinsing means 9 which in this case were jets of demineralized water. The sheet was then dried and cooled. After rolling as in Example 1, stocking and unrolling, impressions appeared on the sheet. A heat treatment at 100° C. for 5 minutes definitively removed all the impressions.

The presence of an amine catalyst in the bath of boiling water enabled the length of treatment with boiling water to be reduced.

EXAMPLE 4

The same method was used as in Example 2, except that the sheet was treated in a bath of boiling water containing 5% by weight of DABCO for 5 minutes.

The NCO/CH ratio measured was 0.

The impressions which were apparent upon unrolling the sheet disappeared definitively after a heat treatment at 100° C. for 5 minutes.

EXAMPLE 5

The same method was used as in Example 1. At the exit of the polymerization tunnel, the sheet, which was still on its formation support, was passed into the part of the device shown on FIG. 2. The assembly passed into a chamber 18 containing water vapor 19 at approximately 120° C.-13° C. The length of passage was approximately 4 minutes. The water vapor was introduced into the chamber by ramp 20 under a pressure of approximately 6 bars.

After this treatment with water vapor, the NCO/CH ratio measured 0.

The sheet was cooled by passage under the cooling chamber 21 and it was removed from the formation support by roller 22 to be rolled by being associated with the interpolated polyethylene film 26 and stocked in the form of a reel 27.

On subsequent unrolling, impressions to the interpolated film were apparent on the sheet.

After heat treatment at 100° C. for 5 minutes, the impressions definitively disappeared.

The treatment with water vapor is particularly interesting because it can be carried out while the sheet is still on its formation support and therefore before any risk of marking by a removal roller.

EXAMPLE 6

The same method was used as in Example 1, except that the EA layer was formed from a different polyol component. In this case the polyol component was prepared by mixing polytetramethylene glycol, with a molecular weight of 1000, with 1,4-butanediol and polycaprolactonetriol, with a molecular weight of 300, with the proportions of the three constituents being such that the polytetramethylene glycol brought 0.35 equivalent in hydroxyl groups, the 1,4-butanediol bringing 0.55, and the polycaprolactonediol bringing 0.1.

The remainder of the manufacture of the EA layer was carried out in accordance with the description of Example 1.

At the exit of the polymerization tunnel, the NCO/OH ratio measured approximately 0.6.

The sheet obtained was removed from the pouring support and subjected to the treatment described in Example 1.

After the heat treatment and before assembly with the support to form the laminated glazing, the EA layer was free from impressions.

The optical quality obtained was maintained subsequently.

EXAMPLES 7 TO 9

The EA layer described in Example 5 was used in the same manner as in Examples 2, 3 and 4, respectively. The results of the treatment of the EA layer with hot water or water vapor were similar.

REFERENCE EXAMPLE 4

The method of Example 6 was repeated, except that at the exit of the polymerization tunnel, the sheet was left on the pouring support for 14 days at 20° C. After this time, the NCO/CH ratio was equal to zero.

REFERENCE EXAMPLE 5

The method of Example 6 was repeated, except that the polymerization cycle lasted for 90 minutes at 120° C. The NCO/CH ratio was then 0.

REFERENCE EXAMPLE 6

The method of Example 6 was repeated, except that the polymerization cycle lasted for 20 minutes at 170° C. The NCO/OH ratio was then 0.

REFERENCE EXAMPLE 7 to 9

The method of Reference Examples 4 to 6 was repeated, except that the sheet obtained was rolled with an interpolated film. After stocking and unrolling, the sheet was submitted to a heat treatment of 100° C. for 5 minutes.

After said treatment, the impressions left by the interpolated film had disappeared.

TABLE 1

| Examples | Scratch Resistance of The MPA Layer | Result With Marking |
| --- | --- | --- |
| 1 | 40 | — |
| 2 | 16 | GOOD |
| REFERENCE 1 | 40 | NO |
| REFERENCE 2 | 40 | NO |
| REFERENCE 3 | 40 | NO |
| 3 | 40 | GOOD |
| 4 | 40 | GOOD |
| 5 | | GOOD |
| 6 | | GOOD |
| 7 TO 9 | | GOOD |
| REFERENCE 4 | 40 | — |
| REFERENCE 5 | 40 | — |
| REFERENCE 6 | 40 | — |
| REFERENCE 7 TO 9 | 40 | GOOD |

The result with marking is noted as good when the impressions from marking can be removed by a heat treatment. It is noted as bad when the impressions from marking cannot be removed.

Table 1 shows that treatment with water enables the completion of the polymerization of the polyurethane and that it gives the layer the property of rendering the impressions from marking removable by using a subsequent heat treatment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacture of a high optical quality polyurethane layer having energy-absorbing properties, by reactive pouring or reactive pulverization of the reaction components followed by a polymerization of said layer, wherein the polyurethane layer is treated while it is in an ongoing state of polymerization, corresponding to an NCO/CH ratio of less than 0.7, using water in liquid or vapor form, until an NCO/CH ratio of 0 is obtained.

2. The method in accordance with claim 1, wherein the layer is treated with hot water at a temperature above 80° C., and preferably above 90° C., for a period of at least one minute.

3. The method in accordance with claim 2, wherein the water is water boiling at 100° C.

4. The method in accordance with claim 1, wherein the treatment is carried out by steeping the layer in an aqueous solution containing an amine catalyst.

5. The method in accordance with claim 1, wherein the treatment is carried out by steeping the layer in an aqueous solution containing reactive products with isocyanate groups, in particular sodium bisulfite or diamines.

6. The method in accordance with claim 1, wherein the water vapor is at a temperature of between 120° C. and 140° C.

7. The method in accordance with claim 6, wherein the treatment with water vapor is carried out on the layer while it is still on its formation support.

8. The method in accordance with claim 1, wherein after the treatment with water, the layer which has been placed in contact with a film for stocking is subjected, after removal of the film, to a heat treatment.

9. The method in accordance with claim 8, wherein the subsequent heat treatment consists of bringing the layer to a temperature of at least approximately 100° C.

10. The method in accordance with claim 9, wherein the layer is brought to at least approximately 100° C. for at least 1 minute.

11. The method in accordance with claim 1, wherein the polyurethane layer having energy-absorbing properties is associated with a heat-hardenable polyurethane layer having scratch and abrasion resistance properties.

12. A device for carrying out the method of manufacture of a high optical quality polyurethane layer having energy-absorbing properties comprising a pouring support means comprised of a flat movable bed for forming the layer, a head for supplying a reaction mixture to said bed through either pouring or pulverization, a polymerization tunnel, means for treatment of the polyurethane layer with hot water or water vapor arranged just after the polymerization tunnel.

13. The device in accordance with claim 12, characterized in that it contains a water or aqueous solution bath (7) for steeping the polyurethane layer and drying means (11) which follow.

14. The device in accordance with claim 13, characterized in that it contains, between the water bath (7) and the drying means (11), means (9) for rinsing the layer.

* * * * *